United States Patent [19]

Schwärzler

[11] 3,827,657
[45] Aug. 6, 1974

[54] FLAP ARRANGEMENT FOR THRUST DEFLECTION IN AIRCRAFT

[75] Inventor: Hans-Jürgen Schwärzler, Munich, Germany

[73] Assignee: Vereinigte Flugtechnische Werke-Fokker Gesellschaft mit beschrankter Haftung, Bremen, Germany

[22] Filed: Feb. 8, 1973

[21] Appl. No.: 330,475

[30] Foreign Application Priority Data
Feb. 16, 1972 Germany............................ 2207189

[52] U.S. Cl..................... 244/42 DA, 244/12 D
[51] Int. Cl. ............................................. B64c 9/20
[58] Field of Search ........ 244/42 D, 42 DA, 42 DB, 244/42 DC, 42 C, 42 CB, 12 A, 12 D, 23 D

[56] References Cited
UNITED STATES PATENTS

| 2,152,835 | 4/1939 | Bolas .............................. 244/42 D |
| 2,556,326 | 6/1951 | Grant ........................... 244/42 DB |
| 3,332,644 | 7/1967 | Whittley........................ 244/42 DC |
| 3,442,470 | 5/1969 | Farbridge et al............... 244/42 DA |

FOREIGN PATENTS OR APPLICATIONS
854,083   4/1940   France............................ 244/42 CB Primary Examiner—Trygve M. Blix
Assistant Examiner—Barry L. Kelmachter
Attorney, Agent, or Firm—Ralf H. Siegemund

[57] ABSTRACT

A flap arrangement in aircraft wings having a pair of flaps in stacked disposition and normally forming part of a wing. The flaps have their front ends pivoted up to define a flow and thrust redirecting channel, in which the lower flap is aligned with the upper wing surface and the upper flap is erected sufficiently high to establish a flow redirecting channel with converging cross section.

11 Claims, 5 Drawing Figures

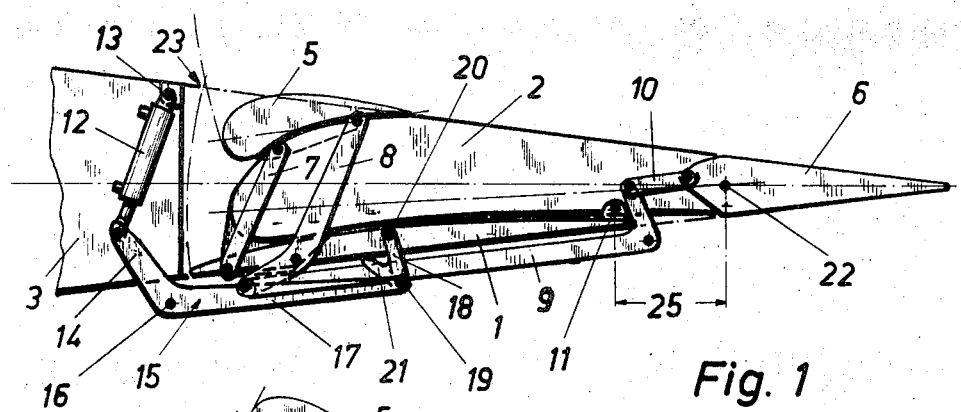
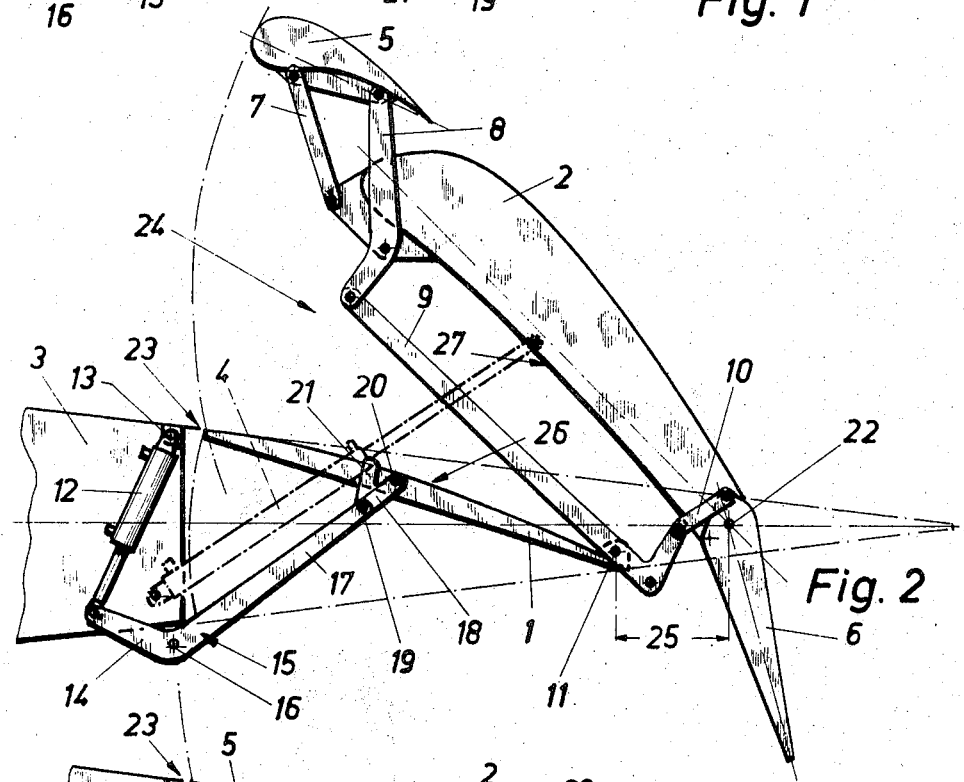
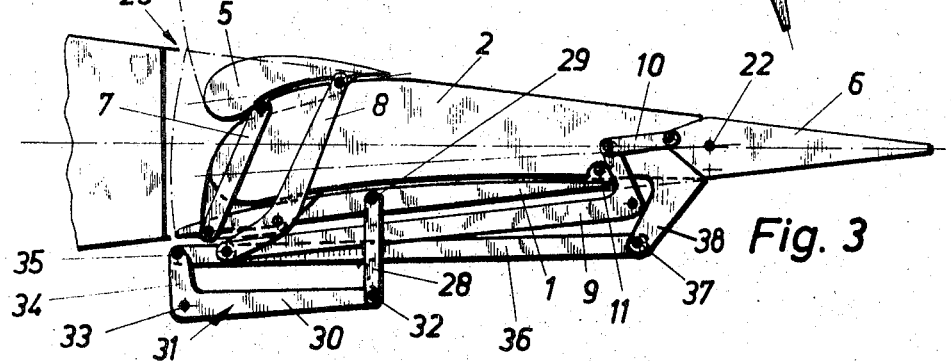
Fig. 1
Fig. 2
Fig. 3

FLAP ARRANGEMENT FOR THRUST DEFLECTION IN AIRCRAFT

BACKGROUND OF THE INVENTION

The present invention relates to an arrangement of flaps on airplane wings, which flaps constitute normally a continuation of the wing contour but can be moved into position, in which they provide redirection of thrust producing flow.

Airplanes with short takeoff and landing characteristics are usually provided with means for deflecting the thrust as produced by the engines. Such means are flaps which are adapted to be swung out, e.g., they are pivotally linked to the rear ends of the airplane wings. This way, the thrust as produced by the main engine, can be used directly for obtaining upward lift of the airplane. In a known arrangement, the individual flaps are movably positioned at their leading or forward ends and are provided with additional flexible air deflector plates between the flaps.

Such known arrangements, however, are insufficient for airplanes in which the thrust producing jets are provided above the wings. To this end, it has been suggested to construct the rear end of the wings as flaps which in their displaced and swung out position extend into the flow of the thrust producing jets, and deflect the jet flow from above the wing in down direction. This arrangement operates quite satisfactorily, except that it was observed that an unfavorable flow pattern occurs between the wing proper and the movable flaps. This flow pattern introduces additional losses during the thrust deflection. These additional losses, in essence, are created by flow across the edge of the upper surface of the airplane wing. Since the flaps are retracted within the contour of the wings when in their unoperated position, only limited possibilities exist as regards to the construction of the flaps in this region. Also, the flaps cannot be constructed as cover plates since a pointed nose of the flap causes vorticity and eddy losses in the air intake flow of the deflection arrangement.

SUMMARY OF THE INVENTION

It is an object of the invention to provide a thrust deflection arrangement by means of control flaps using a simple actuating system for the flaps, but providing a more advantageous flow pattern, the arrangement being particularly adapted for use with aircraft in which the thrust is produced above the airplane wing.

According to the invention, such a flow deflection arrangement comprises at least two parallel flaps, one provided above the other and each having its respective rear end linked to the aircraft by means of fixed pivots. These flaps are pivotable by means of a linkage system such that the lower one of the flaps reaches its front end up position when this front end aligns with the upper surface of the wing and forms an extension of the end portion of the actual wing, while the upper one of the flaps swings up. Upper and lower flaps together form a thrust deflection channel into which feed the thrust producing jets. The arrangement according to the invention avoids the losses normally occurring at the end portions of the aircraft wing, and, moreover, sets up a favorable flow conduction pattern. In addition, this arrangement establishes a nozzle-like deflection channel, producing additional acceleration of the air flow.

In order to provide a favorable intake of air, it is further suggested that the upper flap occupies the major part of the wing thickness profile. As a result, the upper flap is constructed to have a nose portion which is quite streamlined with little propensity to develop vorticity in the passing flow.

In order to realize an outlet aperture of the deflection channel without additional movement of the respective flaps relative to one another, the respective pivot points of the flaps have offset disposition relative to one another and commensurate with the exit opening of the thrust deflection channel.

Furthermore, the two surface portions of the flaps which form the deflection channel respectively define a convex curvature, on the one hand, and a concave curvature on the other hand. As a result, the deflection angle is effectively increased under favorable air flow conditions as the channel is now provided with a gradually increasing down direction component as to its flow redirecting chracteristics.

The two flaps are controlled as to disposition in that the upper flap is subject to positioning by a drive, e.g., a hydraulic drive, while the lower flap is made to follow the upper one, but only until the front end of the lower flap reaches the level of the upper wing surface.

In furtherance of the invention, the two flaps can be rather easily controlled. Resilient means urge (or tend to urge the lower partial flap into its deflective end position (front end up) while the upper partial flap is deflected up by means of a drive or actuator element. As a consequence, the lower partial flap is always pressed against the upper partial flap from below while the disposition of the latter is under individual control. As the upper flap pivots up as controlled by the actuator, the lower flap simply follows that displacement, but only until its front end is flush with the upper wing surface. In essence, this simple arrangement only requires one actuating aggregate.

In order to automatically hold the lower flap in its deflected, front end up position, the spring element is arranged to that with its one end it acts upon a movably mounted two-armed lever, and with its other end it connects with the lower flap via a coupling element. In the deflected end position, the several pivot points are aligned and realize a dead-center position, inhibiting further erection of the front end of the lower flap. This way, the lower flap has a definite up position without necessitating a positive lock.

A further feature of the invention resides in an embodiment in which the upper and lower flaps are under control respectively of two four-bar actuating arrangements, positioned one behind the other and having each four pivot points. The two sets of pivots have a common pivot point formed on the wing by means of a two-armed lever. Each lever arm is linked to one flap by means of additional linkage that provides for the additional pivots. In the deflected end position of the lower partial flap, three points of four pivot points of the lower partial flap including the common pivot point are aligned, and three of the four pivot points for the upper partial flap, excluding the common pivot point, are likewise aligned. The resulting two dead center situations prevent the lower flap from extending further.

DESCRIPTION OF THE DRAWINGS

While the specification concludes with claims particularly pointing out and distinctly claiming the subject matter which is regarded as the invention, it is believed that the invention, the objects and features of he invention and further objects, features and advantages thereof will be better understood from the following description taken in connection with the accompanying drawings in which:

FIG. 1 illustrates a first example of the preferred embodiment of a control flap arrangement positioned in its rest position;

FIG. 2 shows a view similar to that of FIG. 1, illustrating the control flap arrangement of FIG. 1 in deflected position;

FIG. 3 shows a further example of the preferred embodiment of a control flap arrangement in its rest position, the latter control arrangement incorporating a kinematic coupling of the partial flaps;

Figure 4:
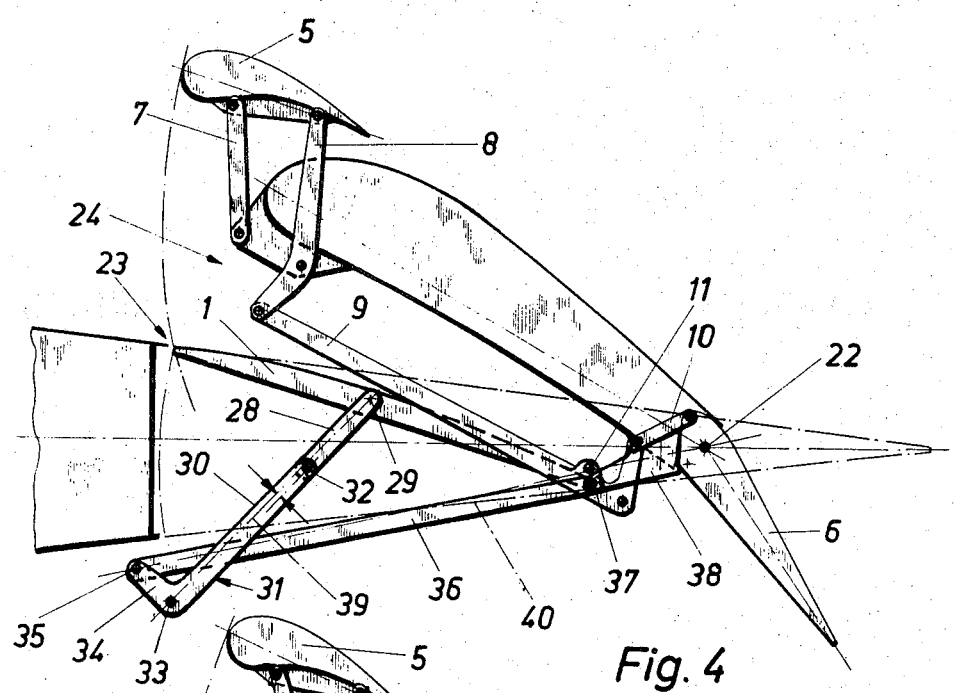
FIG. 4 shows the control arrangement of FIG. 3, illustrating the lower partial flaps in its end position and the upper partial flap in an intermediate position.

Referring now to the drawings in which like reference numerals index like parts, and with attention initially drawn to FIG. 1, there is illustrated a section view through a wing 3 with a trailing edge flap arrangement, provided for thrust deflection. It is assumed that the wing carries a jet engine on its upper surface so that the thrust producing jet flows along the upper side of the drawing; the plane of the drawing traverses that jet flow. The control flap arrangement is seen to essentially comprise a lower flap 1 and an upper flap 2 which, in their normal or unoperated position, are arranged parallel one above the other, within the contour of wing 3 and, actually, form a continuation of the wing. The upper flap 2 occupies the major part of the wing profile thickness.

The deflected disposition of flap 2, relative to the wing 3 is, for example, effected by means of a hydraulic cylinder serving as drive actuator 4 and being positioned between the wing 3 and the upper partial flap 2. Drive 4 is obscured in FIG. 1 and has been drawn in dash-dot lines in FIG. 2 for better clarity. One end of cylinder 4 is pivotally linked to wing 3, the opposite end of the piston rod is pivotally linked to flap 2. The rear end of the upper partial flap 2 is rotatable about a pivot point 22 on wing 3. In order to deflect the upper flap 2 from its normal position, the hydraulic cylinder 4 acts upon the flap 2 at a point above its pivot 22.

In the embodiment shown, the upper flap 2 has a nose and leading end which is provided with an additional flap 5 which, hereinafter, will be referred to as the leading-edge flap of the flap 2. The tail end of the flap 2 is constructed to have a further tail end flap 6 pivotable on the flap 2 proper. As flap 2 swings up, flaps 5 and 6 are deflected themselves by means of a linkage arrangement consisting of levers 7, 8, 9 and 10. These additional flaps 5 and 6 modify the flow characteristic along upper flap 2 which modification is not relevant in principle for the invention. The construction illustrated merely shows that these additional flaps can be provided for without incurring structural complications. Flap 6, for example, is usable as regular control flap, even when not participating in the thrust redirecting function.

The lower flap 1 is pivoted on wing 3 by means of a pivot 11 positioned at the rear end of flap 1. For actuation of the lower partial flap 1, a compression spring in the form of a telescopic spring member 12 is pivoted on wing 3 and bears there against. The free end of the spring member 12 is connected to a lever arm 14 of a two-armed lever 15. The two-armed lever 15 is rotatable about a pivot point 16 which is also fixed in the wing body. The second arm 17 of lever 15 is movably coupled to lower flap 1 by means of a pivot 19 via a linkage 18 which, in turn, is rotatable about a pivot point 20. The linkage 18, as shown, is further provided with a release finger 21.

Spring member 12 urges or tends to urge lower flap 1 into a deflection position, using the levers and intermediaries as described and until the pivot point 16 of the two-armed lever 15 and the linkage points 19 and 20 are aligned. That is the dead center position out of which the flap 1 cannot be erected further by this lever arrangement.

As stated, when thrust deflection is not wanted, upper and lower flaps 1 and 2 have disposition as shown in FIG. 1, and here the lower flap 1 is held against the upper flap 2 by spring 12 which is under compression and tends to expand. During upward movement of the upper flap 2, relative to wing 3 and by means of hydraulic drive 4, the front end of lower flap 1 follows this movement as spring 12 expands, and the flap pivots up until its front end reaches a position (point 23), which is defined by alignment of the leading edge of flap 1 with an edge of wing 3 on the upper surface thereof. In this position, pivot points 16, 19 and 20 are aligned which results in a dead center position of the linkage arrangement, inhibiting further upward deflection of flap 1 by the expanding spring. This, in turn, results in a self-locking feature of the lower flap 1 by making further erection of the flap impossible.

The upper flap 2 continues its up deflection and disengages from flap 1 accordingly. During further up movement of upper flap 2, a thrust deflection channel 24 opens up and is established, which channel deviates the direction of any air flow entering the channel. The entrance to that channel is essentially defined by the opening as between the leading edges of flaps 1 and 2. The outlet aperture of the flow redirecting channel 24 or exit thereof, is defined by the spacing between pivot points 11 and 22. However, these pivots are closer than the distance of the front ends of flaps 1 and 2 in erected position. Accordingly, channel 24 has converging characteristics as to oncoming flow.

In order to increase the angle of deflection, the lower flap 1 is provided with a convex curvature 26 while the upper flap, in contrast, is provided with a concave curvature 27. As a consequence, channel 24 gradually turns the flow entering the gap between the front ends of the flaps to increase the downwardly directed component of flow.

In returning the flaps 1 and 2 into their rest position, an equivalent return motion results in opposite direction, wherein the flap 2 is retracted and upon engagement with flap 1, the latter is likewise retracted. During return of flaps 1 and 2 the orginal dead-center point of lower flap 1 is surmounted in that at first upper flap 2 runs against release finger 21 of linkage or coupling member 18. As a result, pivot point 19 is shifted out of alignment with pivot and linkage points 16 and 20. In the final position, all parts are in position as shown in FIG. 1.

Figure 5:
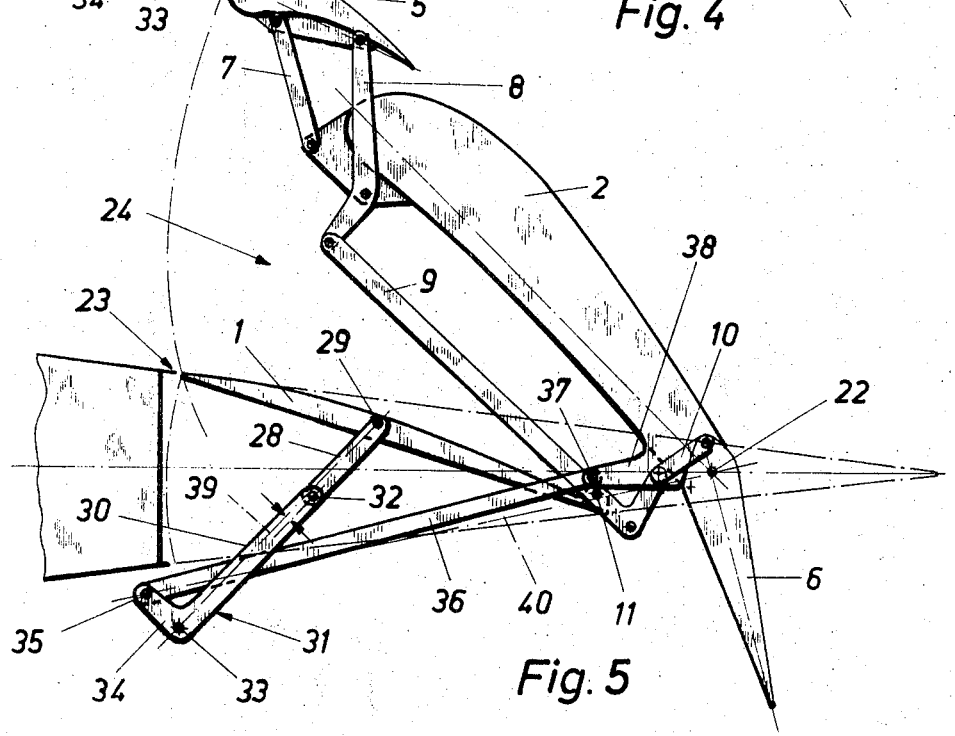
FIG. 5 shows the flap arrangement of FIG. 3 with both flaps positioned in their end position.

FIGS. 3, 4 and 5 show a further embodiment of the invention. The control and flap arrangement is provided with a kinematic coupling between upper and lower flaps 1 and 2, by means of two four-bar actuating arrangements positioned in tandem. As in the arrangement of FIGS. 1 and 2, flaps 1 and 2 are pivotally positioned at their respective rear ends by means of pivots 11 and 22, respectively. Deflection actuation of the flap arrangement likewise is similar to that of FIGS. 1 and 2 and is carried out by primary deflection and retraction of the upper partial flap 2; flap 1 follows that displacement, but in a somewhat different manner.

The lower partial flap 1 is connected to a linkage 28 by means of a pivot 29. The free end of linkage 28 acts upon a lever arm 30 of a two-armed lever 31, and thereby constitutes a fulcrum or pivot point 32. Two-armed lever 31 has a pivot point 33 which is fixed to the wing body and constitutes the common pivot for the two four-bar and four pivot point actuating and linking arrangements. A further linkage 36, in turn, acts upon the second lever arm 34 of two-armed lever 31, linkage 36 being connected at a pivot 37 with the upper flap 2, pivot 37 is positioned on a fixed arm 38 of and extending from upper partial flap 2.

As a result of this arrangement, four pivot points 11, 29, 32 and 33, are provided for the lower flap 1, while the upper partial flap 2 is provided with the four pivots 22, 37, 35 and 33, both four pivot point arrangements have fixed pivot point 33 in common and are coupled thereto by means of the two-armed lever 31 establishing pivot 33. The two four-arm actuating arrangements are arranged so that the lower flap 1 is positioned in its deflected front end up position, when pivots 29, 32 and 22 for flap 1 as well as pivots 35, 37 and 22 for upper flap 2 are respectively, almost completely, aligned (two separate lines, of course). This situation is shown in FIG. 4, with little change in FIG. 5.

During deflection of upper flap 2 from its normal or rest position, lower flap 1 follows this movement by operation of all of the linkage and pivot elements, till it reaches its end position at the projecting edge 23 of wing 3. In this position, pivots 29, 32 and 33, as well as pivots 35, 37 and 22, are almost completely aligned as stated.

Upon further up displacement of flap 2, pivots 32 and 37 move very little relative to the respective lines 39 and 40, so that flap 1 is very little displaced. This is so, because pivots 29, 32 and 33 remain in line, while pivot 37 moves somewhat out of the line 40. FIG. 5 shows flap 2 completely erected for thrust deflection.

Flaps 1 and 2 are returned to their normal or rest position when the actuator 4 releases upper flap 2 and arm 38 now swings down and initiates follower movement of flap 1 for the folding down.

The invention is not limited to the embodiments described above but all changes and modifications thereof not constituting departures from the spirit and scope of the invention are intended to be included.

I claim:

1. Control flap arrangement for aircraft having a wing with an upper surface, there being thrust producing means producing jet flow across the upper wing surface, the flap arrangement provided for selective dispositions, flush with the wing or deflecting the jet flow with a down component of flow, the flap arrangement comprising:

a first, lower flap and a second upper flap positioned parallel one above the other in the flush-with-the-wing disposition;

said flaps having a pivotal connection to the wing at their respective rear edges for individually pivotally linking the respective rear edges of the flaps to the wing at hinge points within the profile of the wing;

drive means coupled to the upper flap for erecting the front end of the upper flap and turning the upper flap on its rear end pivot for placing the upper flap into the said thrust flow for redirecting the thrust flow in down direction; and follower means coupled to the upper and lower flaps for displacing the front end of the lower flap and placing it into alignment with said upper wing surface in dependence upon erection of the front end of the upper flap by operation of the drive means, so that a channel is formed between the lower and the upper flap in the erected position, through which said jet flow is deflected to assume a down component of flow.

2. A control arrangement as defined in claim 1, wherein said hinge points are spaced-apart relative to one another, to define the exit of said channel.

3. Control flap arrangement for aircraft as in claim 1, wherein the follower means includes linkage interconnecting the upper flap and the lower flap and having dead center position when the lower flap has its front end aligned with the upper wing surface, the linkage preventing further erection of the lower flap.

4. A flap arrangement as defined in claim 1, wherein said lower flap has an upper surface and said upper flap has a lower surface, said upper surface defining a convex curvature and said lower surface defining a concave curvature, said surfaces together defining said channel for the intake of air in deflected position of said arrangement.

5. Flap arrangement as in claim 4, the first means and the follower means including a first four pivot point linkage and a second four pivot point linkage for linking the first flap to the second flap, the first linkage having a set of four pivot points, one of which being the pivot point for the first flap, the second four pivot point linkage having a second set of four pivot points, one of which being the pivot point for the second flap, the two linkages having a common pivot point, the common pivot established by a two-arm lever, one arm thereof having another pivot point of the first set of four pivots, the other arm of the two-arm lever having another pivot point of the second set of four pivots, respective three of the four points being aligned when the front end of the first flap is aligned with the upper wing surface.

6. Control flap arrangement for aircraft as in claim 1, wherein the follower means includes a resilient means urging the lower flap against the upper flap, and further includes linkage means inhibiting the lower flap from having its front end lifted above said upper wing surface.

7. Control flap arrangement for aircraft as in claim 6, the linkage means including a two arm lever pivoted on the wing and having one arm coupled to the resilient means and having its other arm coupled to a coupling element on the lower flap, for preventing the resilient means from pivoting the lower flap beyond a dead center position as between the lever, the coupling element and the lower flap.

8. Control flap arrangement for aircraft having a wing with an upper surface, there being thrust producing means producing jet flow across the upper wing surface, the flap arrangement provided for selective dispositions flush with the wing or deflecting the jet flow with a down component of flow, the flap arrangement comprising:

a first, lower flap and a second upper flap positioned parallel one above the other in the flush-with-the-wing disposition;

said flaps having a pivotal connection to the wing at their respective rear edges for individually pivotally linking the respective rear edges of the flaps to the wing; the respective pivot points being spaced-apart;

lever means linked between a stationary pivot on the wing and a point on the lower flap for lifting the front end of the lower flap, until this front end is aligned with the upper wing surface;

drive means connected to the upper flap for lifting the front end of the upper and into the jet flow; and means connected to the lever means for operating this lever means in dependence upon lifting of the front end of the upper flap by operation of the drive means to obtain lifting of the front end of the lower flap to establish a converging channel as between the lifted upper and lower flaps for deflecting the jet flow to assume a down flow component with exit of flow through said spaced-apart pivots as smallest cross-section.

9. A control flap arrangement as in claim 8, wherein the lever means are two hinged lever arms, which are in an angled position when the lower flap is not erected, the hinged lever arms when operated lifting the front end of the lower flap until the hinged lever arms are on a straight line.

10. A control flap arrangement as in claim 9, the means for operating including lever linkage coupling the lever means to the upper flap for causing the lever means to be operated upon erection of the upper flap.

11. A control flap as in claim 10, wherein the lever linkage includes a lever arm integral with the one of the lever arms that is pivoted to the stationary point of the wing and another set of hinged levers connecting the integral lever arms with the upper flap to pivot the lever arms and to assume a less angled disposition when the drive means has erected the front end of the upper flap, than in the folded down position of the upper flap means.

* * * * *